United States Patent
Fitzpatrick

(10) Patent No.: US 11,273,734 B2
(45) Date of Patent: Mar. 15, 2022

(54) OCCUPANT SUPPORT

(71) Applicant: Faurecia Automotive Seating, LLC, Auburn Hills, MI (US)

(72) Inventor: Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 100 days.

(21) Appl. No.: 16/834,165

(22) Filed: Mar. 30, 2020

(65) Prior Publication Data
US 2021/0300215 A1   Sep. 30, 2021

(51) Int. Cl.
*B60N 2/26* (2006.01)
*B60N 2/32* (2006.01)
*B60N 2/30* (2006.01)
*B60N 2/28* (2006.01)
*B60N 2/36* (2006.01)
*B60N 3/06* (2006.01)

(52) U.S. Cl.
CPC ............... *B60N 2/26* (2013.01); *B60N 2/28* (2013.01); *B60N 2/30* (2013.01); *B60N 2/3081* (2013.01); *B60N 2/3097* (2013.01); *B60N 2/32* (2013.01); *B60N 2/36* (2013.01); *B60N 3/06* (2013.01)

(58) Field of Classification Search
None
See application file for complete search history.

(56) References Cited

U.S. PATENT DOCUMENTS

| | | | | |
|---|---|---|---|---|
| 4,118,066 A | * | 10/1978 | Ricke | B60J 11/025 296/136.03 |
| 4,943,105 A | * | 7/1990 | Kacar | A01K 1/0272 119/28.5 |
| 5,641,254 A | * | 6/1997 | Sullivan | B60N 2/90 410/98 |
| 6,053,569 A | * | 4/2000 | Flyborg | B60N 2/203 297/94 |
| 6,786,546 B2 | | 9/2004 | McConnell | |
| 2007/0120409 A1 | * | 5/2007 | Leeds | A47C 27/14 297/423.26 |
| 2009/0184535 A1 | * | 7/2009 | Kowalski | B60N 2/3065 296/65.05 |
| 2013/0200671 A1 | * | 8/2013 | Herzberg | B60N 2/01 297/250.1 |
| 2018/0304784 A1 | * | 10/2018 | Ricks | B60N 2/6063 |
| 2020/0114863 A1 | * | 4/2020 | Radion | B60R 22/26 |
| 2020/0405066 A1 | * | 12/2020 | Hall | A47C 17/132 |

FOREIGN PATENT DOCUMENTS

| | | | |
|---|---|---|---|
| CN | 2538606 Y | 3/2003 | |
| DE | 102015206161 A1 | 10/2016 | |
| DE | 102015110255 A1 | 12/2016 | |
| EP | 0982183 A2 * | 3/2000 | ............... B60N 2/36 |
| EP | 3508376 A1 | 7/2019 | |

\* cited by examiner

*Primary Examiner* — David E Allred
(74) *Attorney, Agent, or Firm* — Barnes & Thornburg LLP

(57) ABSTRACT

An occupant support includes a seat frame and a seat pad coupled to the seat frame. The seat pad includes a cushion member fixed to the seat frame and an outer trim arranged to cover the cushion member. Portions of the outer trim are movable relative to the rest of the occupant support.

12 Claims, 5 Drawing Sheets

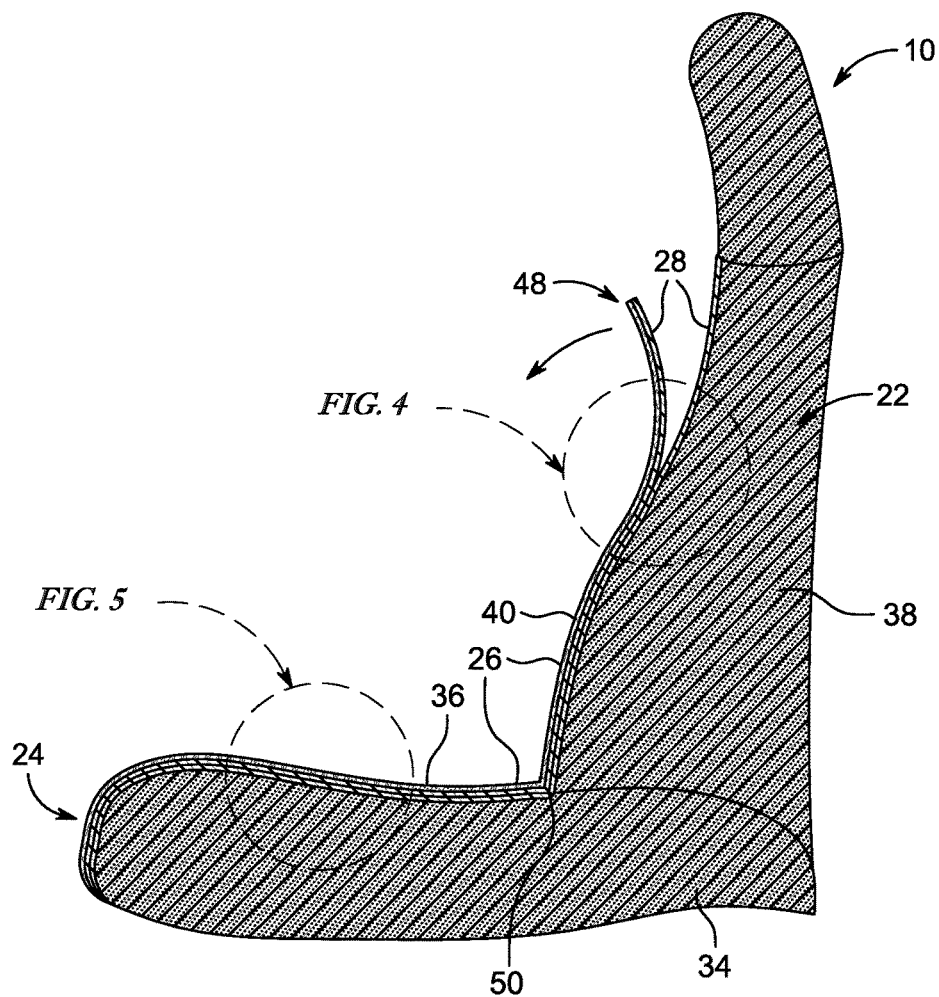
FIG. 3
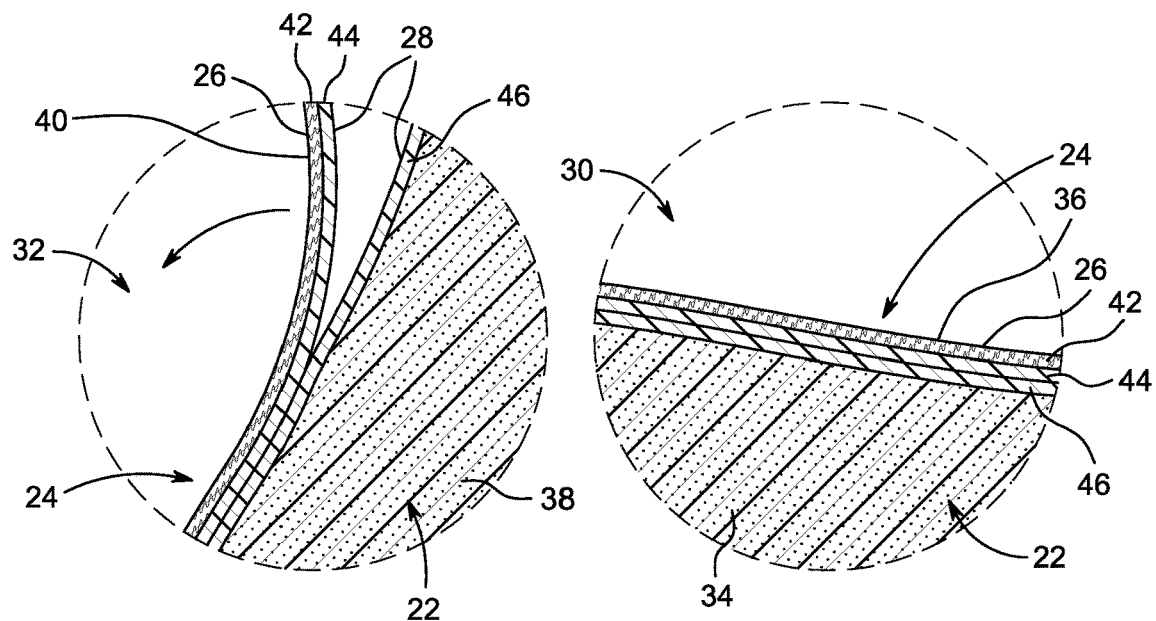
FIG. 4
FIG. 5

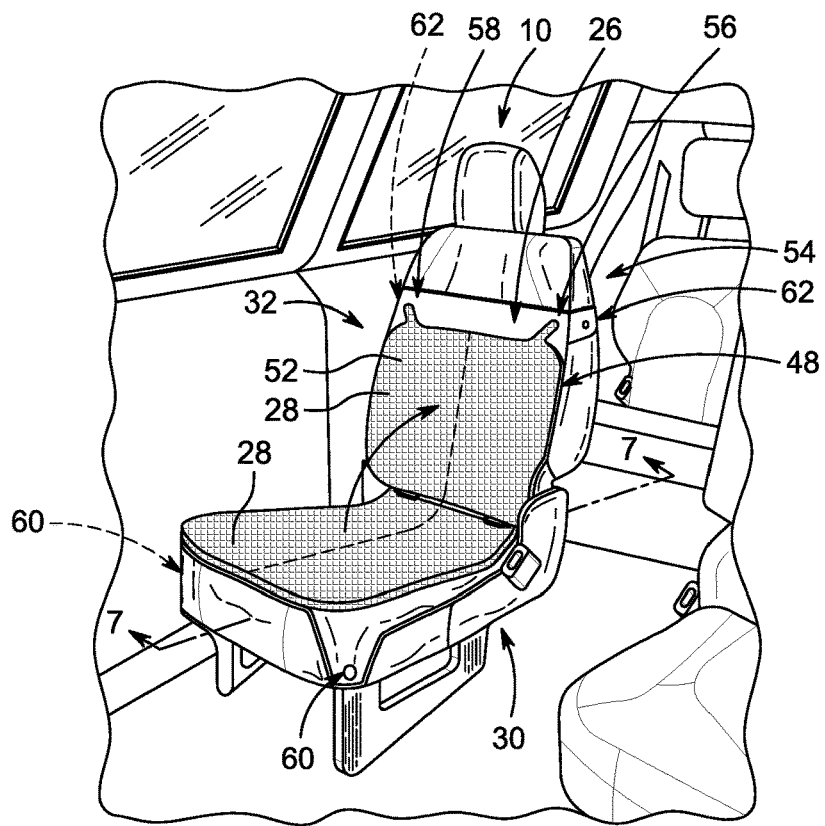
FIG. 6
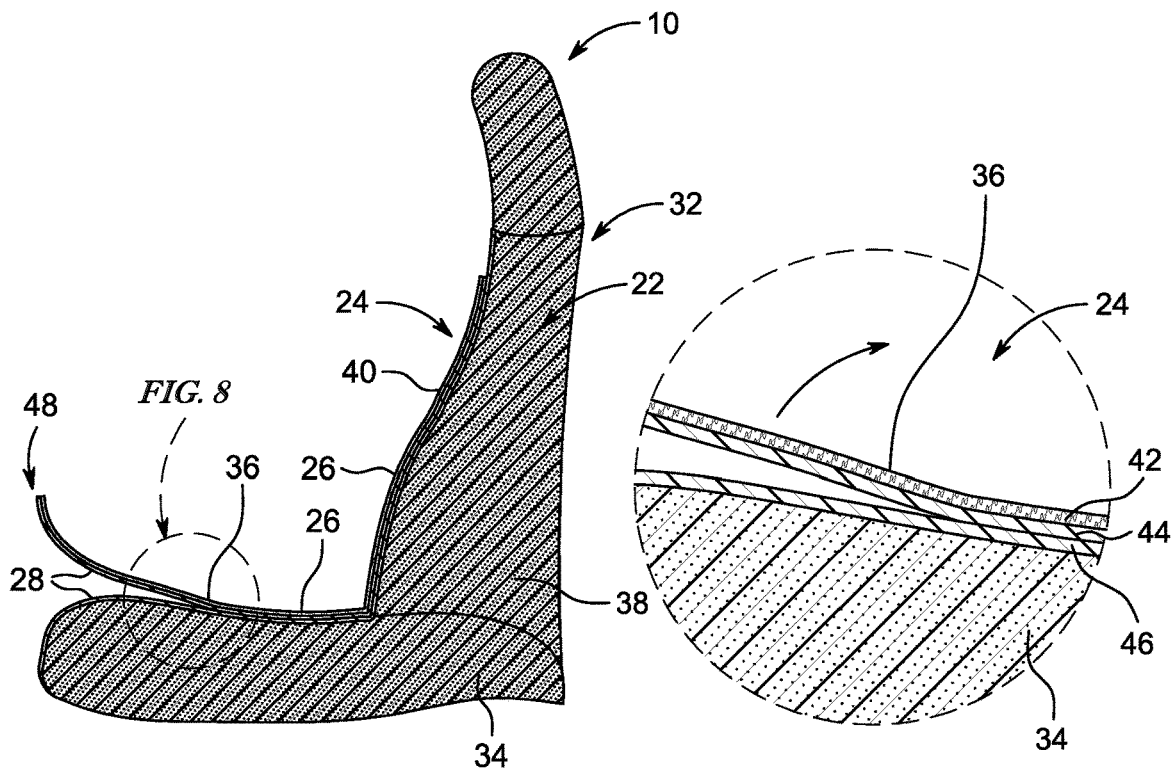
FIG. 7
FIG. 8

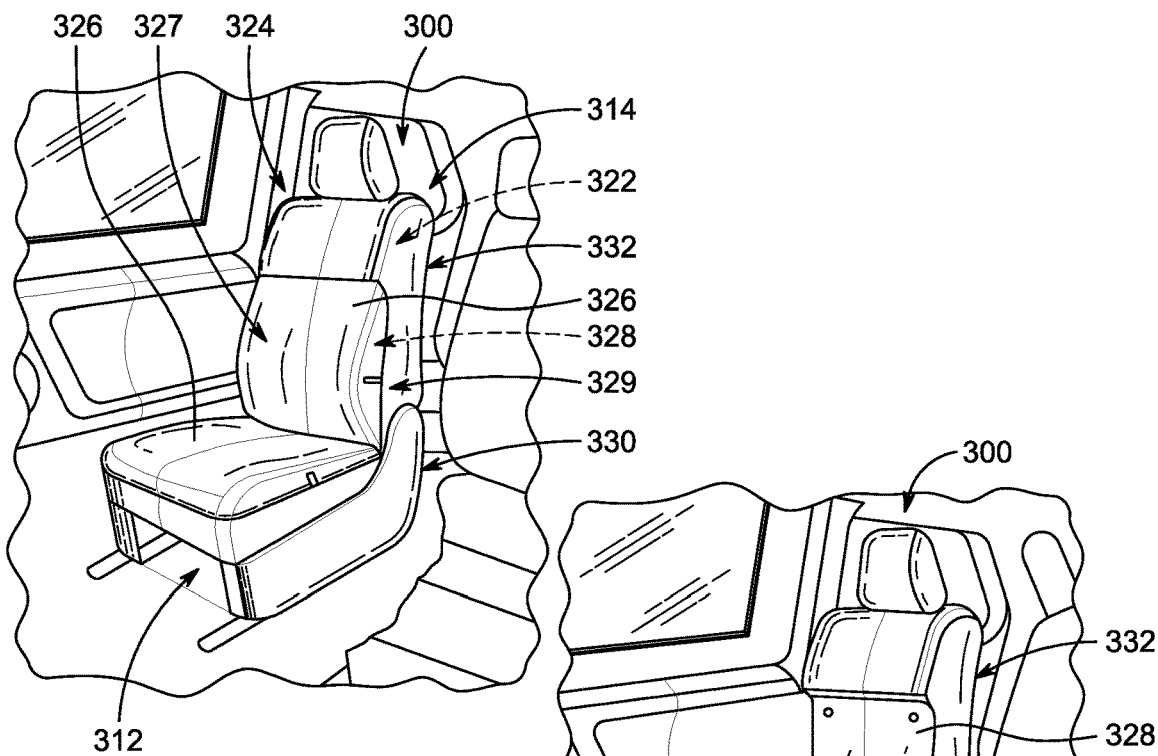
FIG. 12
FIG. 13
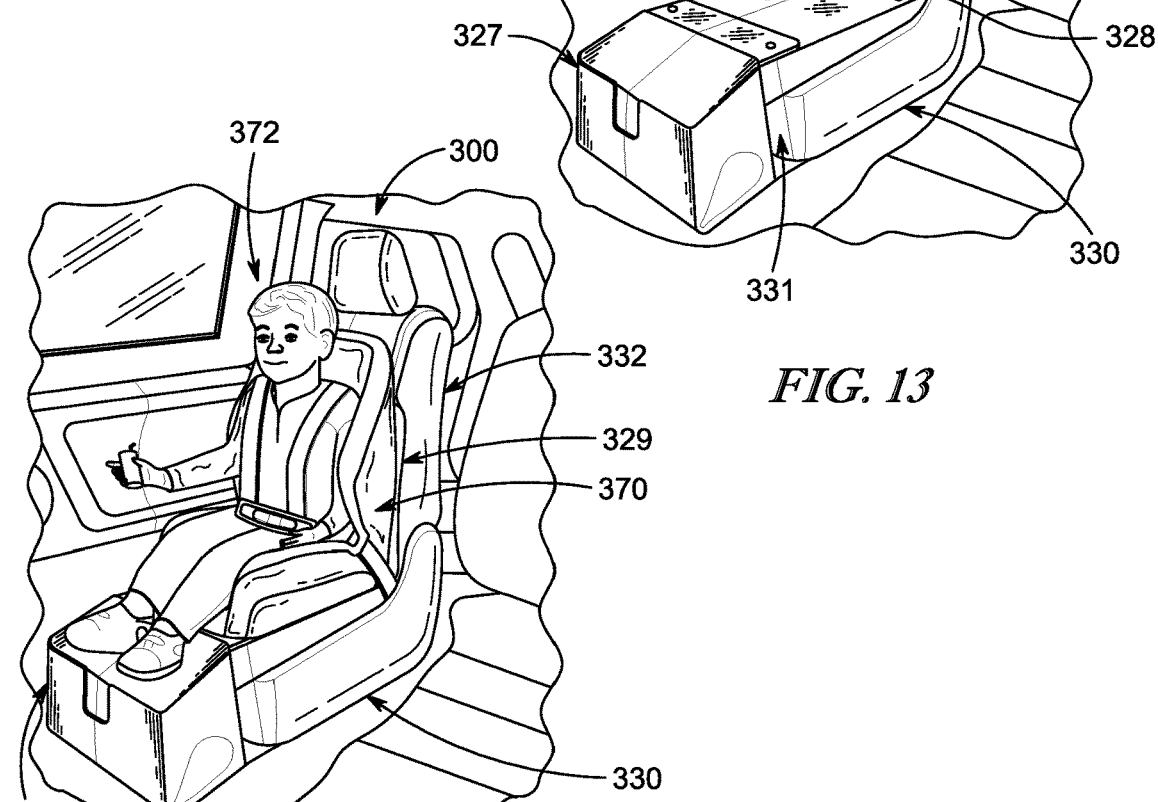
FIG. 14

OCCUPANT SUPPORT

BACKGROUND

The present disclosure relates to vehicles, and particularly to occupant supports for use in a vehicle. More particularly, the present disclosure relates to an occupant support that includes a seat bottom and a seat back.

SUMMARY

According to the present disclosure an occupant support for use in a vehicle includes a seat frame and a seat pad coupled to the seat frame. The seat frame is adapted to mount the occupant support to a floor of a vehicle and to support the seat pad above the floor for use by occupants in the vehicle. The seat pad is adapted to support an occupant in a normal occupant-support configuration of the seat pad.

In illustrative embodiments, the seat pad is configured to change from the normal occupant-support configuration to a temporary object-support configuration when the occupant support is being used to support objects thereon. The seat pad includes a cushion member that is coupled to the seat frame, an outer occupant-support surface that is arranged to contact and support an occupant in the occupant-support configuration, and an object-support surface that is arranged to contact and support an object in the object-support configuration.

In illustrative embodiments, the occupant-support surface establishes an outermost surface of the seat pad in the occupant-support configuration and covers the object-support surface to locate the object-support surface between the cushion member and the occupant-support surface. The occupant-support surface is made from a material that provides a greater degree of comfort for the occupant and aesthetic appearance for the occupant support compared to the object-support surface.

In illustrative embodiments, the seat pad is configured to change from the occupant-support configuration to the object-support configuration when the occupant support is being used to support an object thereon such as a child car seat, for example. In the object-support configuration, the occupant-support surface is moved from providing the outermost surface of the seat pad to expose the object-support surface such that the object-support surface establishes the outermost surface of the seat pad. The object support-surface is made from a material with a greater degree of toughness compared to the occupant-support surface to minimize damage to the occupant support while supporting an object thereon.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 3 is a cross sectional view of the occupant support of FIGS. 1 and 2 showing the outer occupant-support surface being peeled away from the seat back and being moved toward the seat bottom to arrange the occupant support in the object-support configuration as shown in FIG. 2;

FIG. 4 is an enlarged portion of the cross section shown in FIG. 3 showing that the seat back includes an outer layer made from a first material that establishes the occupant-support surface, a first inner layer coupled to the outer layer to move therewith and made from a second material different than the first material, and a second inner layer coupled to a cushion member of the seat back in a fixed position and made from the second material to cooperate with the first inner layer to establish the object-support surface when the occupant support is in the object-support configuration;

FIG. 5 is an enlarged portion of the cross section shown in FIG. 3 showing that the seat bottom includes an outer layer made from a first material that establishes the occupant-support surface, a first inner layer coupled to the outer layer to move therewith, as suggested in FIG. 7, and made from a second material different than the first material, and a second inner layer coupled to a cushion member of the seat bottom in a fixed position and made from the second material to cooperate with the first inner layer to establish the object-support surface when the occupant support is in the object-support configuration;

FIG. 6 a perspective view of the occupant support with the outer layer and the first inner layer of the seat bottom moved away from the seat bottom and arranged to overlie the outer layer of the seat back to establish the object-support configuration;

FIG. 7 is a cross sectional view of the occupant support showing the outer layer and the first inner layer of the seat bottom being peeled away from the second inner layer of the seat bottom and being moved toward the seat back to establish the object-support configuration;

FIG. 8 is an enlarged portion of the cross section shown in FIG. 7;

FIG. 12 is a perspective view of a third embodiment of an occupant support including a seat pad that has an occupant support trim cover that folds into a compact-storage configuration and attaches to a front end of the seat bottom, as shown in FIGS. 13 and 14 to provide a foot rest for a child seated in a child car seat that is resting on the object-support surface;

FIG. 13 is a perspective view of the occupant support of FIG. 12 showing the occupant-support trim cover in the compact-storage configuration; and FIG. 14 is a perspective view of the occupant support of FIG. 13 showing a child seated on a child car seat that is resting on the object-support surface of the occupant support when the occupant-support trim cover is in the compact-storage configuration to preserve the occupant-support trim cover.

DETAILED DESCRIPTION

Figure 1:
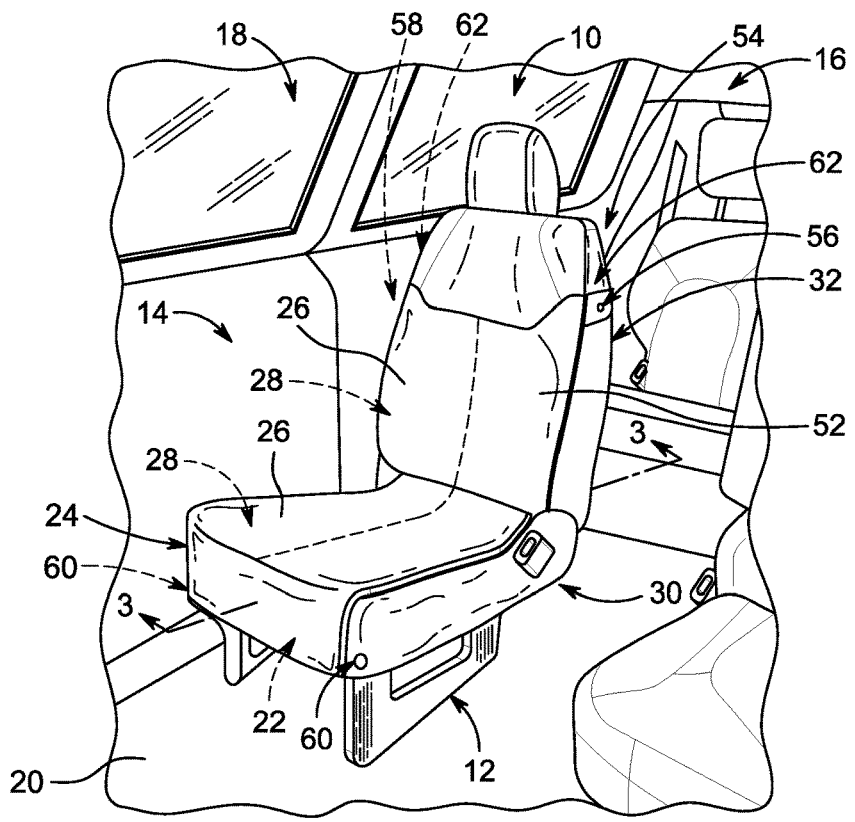
FIG. 1 is a perspective view of an occupant support located within a cabin of a vehicle in a normal occupant-support configuration to support an occupant thereon for transportation in the vehicle, the occupant support including a seat bottom arranged to overlie a floor of the vehicle and a seat back coupled to the seat bottom and arranged to extend upwardly away from the floor and the seat bottom.
Figure 2:
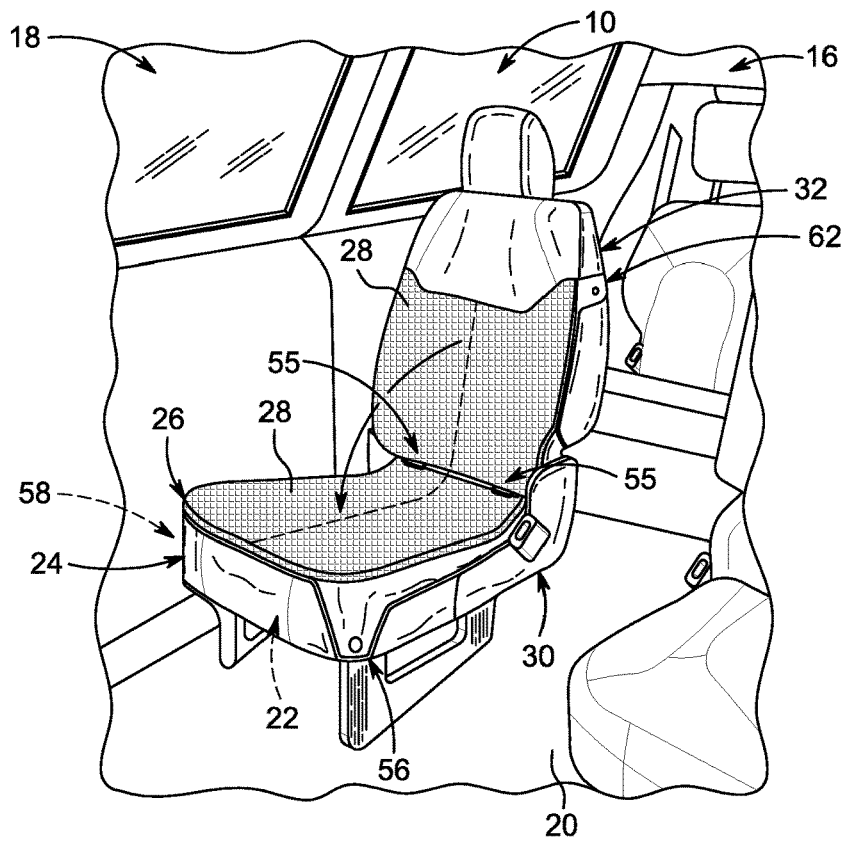
FIG. 2 is a perspective view of the occupant support shown in FIG. 1 in a temporary object-support configuration in which an outermost occupant-support surface of the occupant support is moved relative to the rest of the occupant support to expose an inner object-support surface of the occupant support that is configured to engage an object resting on the occupant support without the object contacting the occupant-support surface so that an appearance and integrity of the occupant-support surface is preserved.
Figure 9:
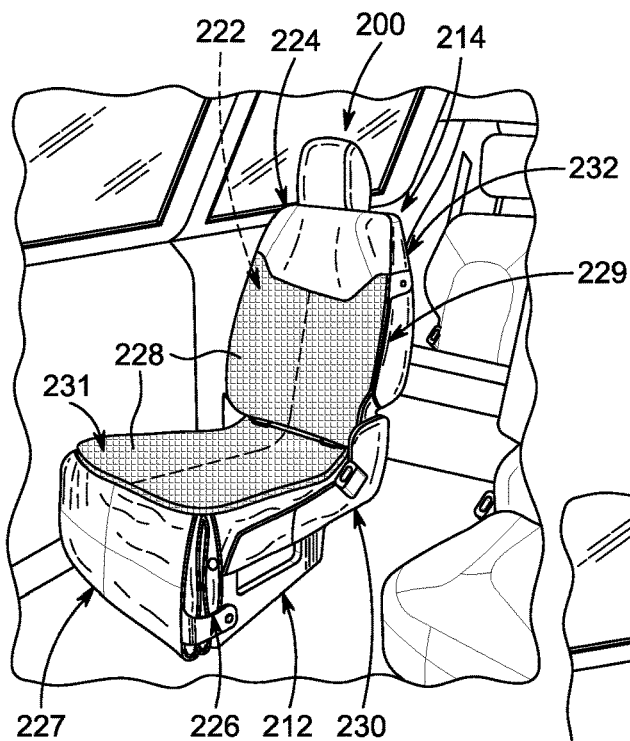
FIG. 9 is a perspective view of a second embodiment of an occupant support including a seat pad that has an inner object-support trim cover and an outer occupant-support trim cover that is completely removable from the object-support trim cover and showing that the occupant-support trim cover is attachable to a front end of the seat bottom for storage when the occupant support is in the object-support configuration.
Figure 10:
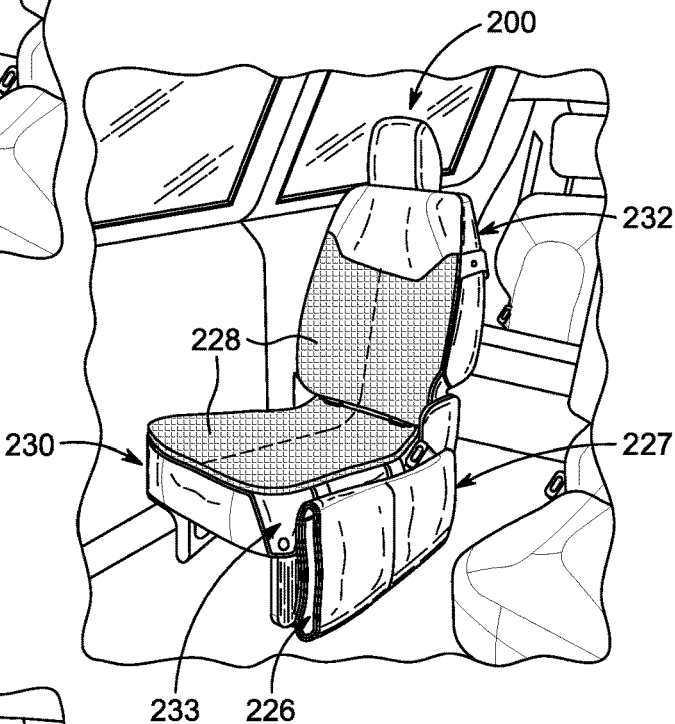
FIG. 10 is a perspective view of the second embodiment of the occupant support shown in FIG. 9 showing the occupant-support trim cover attached to a side of the seat bottom for storage when the occupant support is in the object-support configuration.
Figure 11:
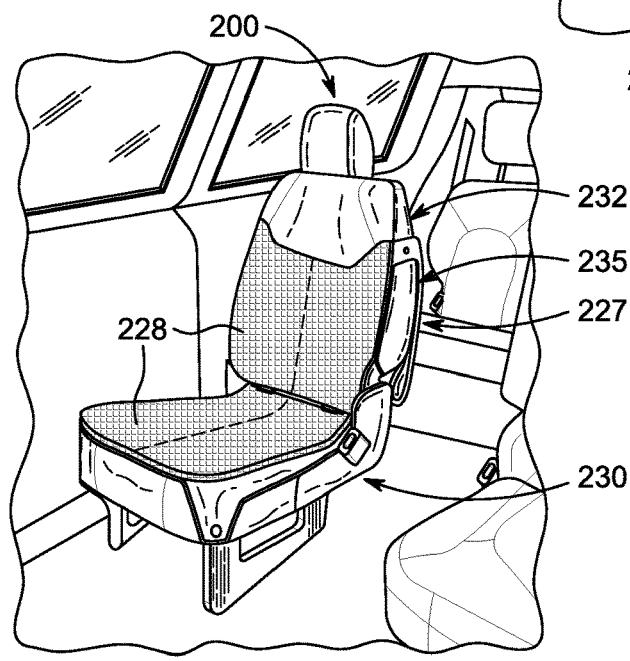
FIG. 11 is a perspective view of the second embodiment of the occupant support shown in FIG. 9 showing the occupant-support trim cover attached to a back side of the seat back for storage when the occupant support is in the object-support configuration.

A first embodiment of an occupant support 10 is shown in FIGS. 1-8. The occupant support 10 may be reconfigured from a normal occupant-support configuration as shown in FIG. 1 to a temporary object-support configuration as shown in FIG. 2. When in the object-support configuration, an inner-object support surface 28 that is more resistant to wear and tear is exposed. A second embodiment of an occupant support 200 is shown in FIGS. 9-11 and a third embodiment of an occupant support 300 is shown in FIGS. 12-14.

An occupant support 10, in accordance with the present disclosure, is illustratively shown in FIG. 1 and includes a seat frame 12 and a seat pad 14 coupled to the seat frame 12. The occupant support 10 is positioned in a cabin 18 of a vehicle 16 for transportation with the vehicle 16. The seat frame 12 is coupled to a floor 20 of the vehicle 16. The seat pad 14 covers portions of the seat frame 12 and is configured to support an occupant thereon when the occupant support 10 is in a normal occupant-support configuration as shown in FIG. 1. The occupant support 10 may be changed to a temporary object-support configuration, as shown in FIG. 2, to protect an outer occupant-support surface 26 of the occupant support 10, such as when supporting an object on the occupant support 10 like a child car seat as shown in FIG. 14.

The seat pad 14 includes a cushion member 22 fixed to the seat frame 12 and an outer trim 24 that covers the cushion member 22 as shown in FIGS. 1-3. The cushion member 22 covers the seat frame 12 and provides cushioning to increase comfort for occupants seated on the occupant support 10 when the occupant support 10 is in the occupant-support configuration. In one example, the cushion member s one or more layers of foam, 3-D printed materials, any other suitable alternative, and combinations thereof. The outer trim 24 establishes an outermost surface of the occupant support 10, and the outermost surface of the occupant support 10 changes depending on if the occupant support is arranged in the occupant-support configuration, as shown in FIG. 1, or the object-support configuration, as shown in FIG. 2.

The outer trim 24 has an outer occupant-support surface 26 that establishes the outermost surface of the occupant support 10 when the occupant support is in the occupant-support configuration, as shown in FIG. 1, and an inner object-support surface 28 that establishes the outermost surface when the occupant support 10 is in the object-support configuration as shown in FIG. 2. The occupant-support surfaces 26 covers the object-support surfaces 28 and are configured to support an occupant thereon when the occupant support 10 is in the occupant-support configuration. The object-support surfaces 28 are arranged between the occupant-support surfaces 26 and the cushion member 22 when the occupant support 10 is in the normal occupant-support configuration. The object-support surfaces 28 cover the occupant-support surfaces 26 when the occupant support 10 is in the object-support configuration. The object-support surfaces 28 at least partially conceal the occupant-support surfaces 26 so that objects resting on the occupant support 10 in the object-support configuration do not contact the occupant-support surfaces 26. This maintains the integrity of the occupant-support surfaces 26 to prolong an aesthetic appearance and useful life of the occupant-support surfaces 26.

In one example, the occupant-support surfaces 26 are made from a first material that provides a greater degree of comfort for the occupant and aesthetic appearance for the occupant support 10 compared to the object-support surfaces 28. The object-support surfaces 28 are made from a second material different than the first material and that have a greater degree of toughness compared to the occupant-support surfaces 26 to minimize damage to the occupant support 10 while supporting an object thereon. In the illustrative embodiment, the first material includes cloth or leather while the second material includes vinyl or another suitable material with a greater degree of toughness compared to the first material.

The seat pad 14 includes a seat bottom 30 arranged to overlie the floor 20 of the vehicle and a seat back 32 coupled to the seat bottom 30 and arranged to extend upwardly away from the floor 20 and the seat bottom 30 as shown in FIGS. 1-3. The occupant-support surfaces 26 extend over both the seat bottom 30 and the seat back 32 when the occupant support 10 is in the occupant-support configuration. The object-support surfaces 28 are arranged beneath the occupant-support surfaces 26 in both the seat bottom 30 and the seat back 32 when the occupant support 10 is in the occupant-support configuration. When the occupant support 10 changes to the object-support configuration, the occupant-support surface is removed from at least one of the seat bottom 30 and the seat back 32 to expose the object-support surfaces 28 and conceal the occupant-support surfaces 26.

The seat bottom 30 includes a seat-bottom cushion member 34 and a seat-bottom occupant-support surface 36 as shown in FIGS. 3 and 5. The seat back 32 includes a seat-back cushion member 38 and a seat-back occupant-support surface 40. When the occupant support is in the object-support configuration, the seat-bottom occupant-support surface 36 interfaces with the seat-back occupant-support surface 40 as shown in FIGS. 2 and 6. The seat-back occupant-support surface 40 may be moved away from the seat-back cushion member 38 and arranged to lie against the seat bottom 30 when the occupant support 10 is in the object-support configuration as shown in FIG. 2. Alternatively, the seat-bottom occupant-support surface 36 may be moved away from the seat-bottom cushion member 34 and arranged to lie against the seat back 32 when the occupant support 10 is in the object-support configuration as shown in FIG. 6.

Moving the seat-back occupant-support surface 40 away from the seat-back cushion member 38 or moving the seat-bottom occupant-support surface 36 away from the seat-bottom cushion member 34 exposes the object-support surfaces 28 and conceals the occupant-support surfaces 26 so that an object can be supported on the object-support surfaces 28 without contacting the occupant-support surfaces 26. Moving the seat-back occupant-support surface 40 away from the seat-back cushion member 38 or moving the seat-bottom occupant-support surface 36 away from the seat-bottom cushion member 34 may also expose child car-seat latch mounts 55 (e.g., ISO FIX mounts) as shown in FIG. 2. The latch mounts 55 may be concealed by one of the seat-back occupant-support surface 40 or the seat-bottom occupant-support surface 36 in the occupant-support configuration, as shown in FIG. 1, until the occupant support 10 changes to the object-support configuration.

The outer trim 24 is made up of a plurality of layers that provide the occupant-support surfaces 26 and the object-support surfaces 28 as shown in FIGS. 4 and 5. The outer trim 24 includes an outer layer 42, a first inner layer 44 coupled to the outer layer 42, and a second inner layer 46 coupled to the cushion member 22. The outer layer 42 has the occupant-support surfaces 26 and provides an occupant-support trim cover of the outer trim 24 when the occupant support 10 is in the occupant-support configuration. The first inner layer 44 is coupled to the outer layer 42 in a fixed position for movement with the outer layer 42 as the occupant support 10 changes from the occupant-support configuration to the object-support configuration. The first inner layer 44 and the second inner layer 46 cooperate to provide the object-support surfaces 28 and an object-support trim cover of the outer trim 24 when the occupant support 10 is in the object-support configuration.

The outer layer 42 and the first inner layer 44 are mounted for pivotable movement relative to the rest of the occupant support 10 to change the occupant support 10 from the occupant-support configuration to the object-support configuration. The outer layer 42 and the first inner layer 44 may be removed from the seat back 32 and pivoted downwardly to lie across the seat bottom 30 to change the occupant support 10 to the object-support configuration as shown in FIG. 2. In this arrangement, the first inner layer 44 and the second inner layer 46 cooperate to provide the object-support surfaces 28 along the seat bottom 30 and the seat back 32 while the occupant-support surfaces 26 are arranged between seat-bottom cushion member 34 and the first inner layer 44 along the seat bottom 30.

The outer layer 42 and the first inner layer 44 may be removed from the seat bottom 30 and pivoted upwardly to lie across the seat back 32 to change the occupant support 10 to the object-support configuration as shown in FIG. 6. In this arrangement, the first inner layer 44 and the second inner layer 46 cooperate to provide the object-support surfaces 28 along the seat bottom 30 and the seat back 32 while the occupant-support surfaces 26 are arranged between seat-back cushion member 38 and the first inner layer 44 along the seat back 32.

The outer layer 42 and the first inner layer 44 are provided by at least one movable flap 48 included in the occupant support 10 as shown in FIGS. 3-8. The movable flap 48 may be arranged to lie along the seat back 32 as shown in FIGS. 3-5, or along the seat bottom 30, as shown in FIGS. 6-8. In some embodiments, a corresponding movable flap 48 is arranged to lie along both the seat bottom 30 and the seat back 32. The movable flap 48 has an occupant-support surface 26 on a first side of the movable flap 48 and an object-support surface 28 on an opposite second side of the movable flap 48.

The movable flap 48 is mounted to one of the seat bottom 30 and the seat back 32 for pivotable movement about an axis 50 from an occupant-support position to an object-support position as suggested in FIGS. 3 and 7. In the occupant-support position, the occupant-support surface 26 of the outer layer 42 faces outwardly away from at least one of the seat bottom 30 and the seat back 32. In this occupant-support position, the object-support surfaces 28 of the first inner layer 44 and the second inner layer 46 interface, or directly contact, with one another. In the object-support configuration, the occupant-support surfaces 26 interface with one another and lie along the other of the seat bottom 30 and the seat back 32. In the object-support position, the object-support surfaces 28 of the first inner layer 44 and the second inner layer 46 face outwardly away from the seat bottom 30 and the seat back 32.

Each movable flap 48 includes a main sheet 52 and a retainer unit 54 as shown in FIGS. 2 and 6. The main sheet 52 provides a portion of the occupant-support surfaces on a first side of the main sheet 52 and a portion of the object-support surfaces 28 on an opposite second side of the main sheet 52. The retainer unit 54 is coupled to the main sheet 52 and is configured to retain the main sheet 52 against the seat bottom 30 and the seat back 32 until a user applies a force to decouple the retainer unit 54 from the seat bottom 30 or the seat back 32 to release the main sheet 52 from the seat bottom 30 or the seat back to move between the occupant-support position and the object support position.

The retainer unit 54 includes a first attachment 56 coupled to a first lateral edge of the main sheet 52, a second attachment 58 coupled to a second lateral edge of the main sheet 52, a pair of seat bottom retainers 60 coupled to the seat bottom 30, and a pair of seat back retainers 62 coupled to the seat back 32 as shown in FIGS. 2 and 6. In the illustrative embodiment, the retainer unit 54 comprises a plurality of mechanical retention features such as snap buttons. In other embodiments, another suitable retention feature may be used such as VELCRO® or magnets, for example.

The movable flap 48 may be retained to the seat back in the occupant-support position by mounting the first and second attachments 56, 58 to each corresponding seat back retainer 62 as shown in FIG. 1. The first and second attachments 56, 58 may be released from the seat back retainers 62 so that the movable flap 48 may be pivoted downwardly to lie along the seat bottom 30 in the object-support position as shown in FIG. 2. The first and second attachments 56, 58 may then be secured to each corresponding seat bottom retainer 60 to retain the movable flap 48 in the object-support position along the seat bottom 30.

The movable flap 48 may be retained to the seat bottom 30 in the occupant support position by mounting the first and second attachments 56, 58 to each corresponding seat bottom retainer 60. The first and second attachments 56, 58 may be released from the seat bottom retainers 60 so that the movable flap 48 may be pivoted upwardly to lie along the seat back 32 in the object-support position as shown in FIG. 6. The first and second attachments 56, 58 may then be secured to each corresponding seat back retainer 62 to retain the movable flap 48 in the object-support position along the seat back 32.

A second embodiment of an occupant support 200 is shown in FIGS. 9-11. Occupant support 200 is substantially similar to occupant support 10 except that the occupant-support surfaces 26 are completely removable from the rest of the occupant support 200 to change the occupant support 200 from the occupant-support configuration to the object-support configuration. Similar reference numbers in the 200 series are used in FIGS. 9-11 to indicate similar features between occupant support 200 and occupant support 10. Accordingly, the disclosure above for occupant support 10 is hereby incorporated herein for occupant support 200.

The occupant support 200 includes a seat frame 212 and a seat pad 214 coupled to the seat frame 212. The seat pad 214 covers portions of the seat frame 212 and is configured to support an occupant thereon when the occupant support 200 is in a normal occupant-support configuration. The occupant support 200 may be changed to a temporary object-support configuration, as shown in FIG. 9, when the occupant support 200 is being used to support an object.

The seat pad 214 includes a cushion member 222 fixed to the seat frame 212 and an outer trim 224 that covers the cushion member 222. The cushion member 222 covers the seat frame 212 and provides cushioning to increase comfort for occupants seated on the occupant support 200 when the occupant support 200 is in the occupant-support configuration. In one example, the cushion member 222 is one or more layers of foam, 3-D printed materials, any other suitable alternative, and combinations thereof. The outer trim 224 establishes an outermost surface of the occupant support 200, and the outermost surface of the occupant support 200 changes depending on if the occupant support is arranged in the occupant-support configuration or the object-support configuration as shown in FIG. 9.

The cushion member 222 and the outer trim 224 of the seat pad 214 provide a seat bottom 230 and a seat back 232 coupled to the seat bottom 230 as shown in FIG. 9. The outer trim 224 is made up of a plurality of layers that provide occupant-support surfaces 226 when the occupant support 200 is in the occupant-support configuration and object-support surfaces 228 when the occupant support is in the object-support configuration. The outer trim 224 includes an outer occupant-support trim cover 227 and an object-support trim cover 229. The outer occupant-support trim cover 227 has the occupant-support surfaces 226 and is coupled removably to cover portions of the seat bottom 230 and the seat back 232 when the occupant support is in the occupant support configuration. The object-support trim cover 229 is fixed in place to the seat bottom 230 and the seat back 232 and has the object-support surfaces 228.

The outer occupant-support trim cover 227 may be removed and/or folded out of the way from the object-support trim cover 229 to expose the object-support surfaces 228 there beneath as shown in FIGS. 9-11. The occupant-support trim cover 227 may then be attached to the seat bottom 230 or the seat back 232 out of the way of objects that are placed on the object-support surfaces 228 for storage until the occupant support 200 is changed back to the occupant-support configuration to support a person. The occupant-support trim cover 227 may be attached to a front end 231 of the seat bottom 230 as shown in FIG. 9. The occupant-support trim cover 227 may be attached to a side 233 of the seat bottom 230 or seat back 232 as shown in FIG. 10. The occupant-support trim cover 227 may be attached to a back side 235 behind the seat back 232 as shown in FIG. 11.

The outer occupant-support trim cover 227 may be attached to the seat bottom 230 or the seat back 232 using retainers such as retainer unit 54 discussed above or with another suitable retainer such as a strap or buckle. In other embodiments, the outer occupant-support trim cover 227 may be stored in another location within the cabin of the vehicle such as in a storage compartment or a trunk of the vehicle.

A third embodiment of an occupant support 300 is shown in FIGS. 12-14. Occupant support 300 is substantially similar to occupant support 200. Similar reference numbers in the 200 series are used in FIGS. 12-14 to indicate similar features between occupant support 200 and occupant support 300. Accordingly, the disclosure above for occupant support 300 is hereby incorporated herein for occupant support 300.

The occupant support 300 includes a seat frame 312 and a seat pad 314 coupled to the seat frame 312. The seat pad 314 covers portions of the seat frame 312 and is configured to support an occupant thereon when the occupant support 300 is in a normal occupant-support configuration as shown in FIG. 12. The occupant support 300 may be changed to a temporary object-support configuration, as shown in FIGS. 13 and 14, when the occupant support 300 is being used to support an object.

The seat pad 314 includes a cushion member 322 fixed to the seat frame 312 and an outer trim 324 that covers the cushion member 322. The cushion member 322 covers the seat frame 312 and provides cushioning to increase comfort for occupants seated on the occupant support 300 when the occupant support 300 is in the occupant-support configuration. In one example, the cushion member 322 is one or more layers of foam, 3-D printed materials, any other suitable alternative, and combinations thereof. The outer trim 324 establishes an outermost surface of the occupant support 300, and the outermost surface of the occupant support 300 changes depending on if the occupant support is arranged in the occupant-support configuration or the object-support configuration.

The cushion member 322 and the outer trim 324 of the seat pad 314 provide a seat bottom 330 and a seat back 332 coupled to the seat bottom 330 as shown in FIG. 12. The outer trim 324 is made up of a plurality of layers that provide occupant-support surfaces 326 when the occupant support 300 is in the occupant-support configuration and object-support surfaces 328 when the occupant support is in the object-support configuration. The outer trim 324 includes an outer occupant-support trim cover 327 and an object-support trim cover 329. The outer occupant-support trim cover 327 has the occupant-support surfaces 226 and is coupled removably to cover portions of the seat bottom 330 and the seat back 332 when the occupant support is in the occupant support configuration. The object-support trim cover 329 is fixed in place to the seat bottom 330 and the seat back 332 and has the object-support surfaces 328.

The outer occupant-support trim cover 327 includes a plurality of sections that are foldable relative to one another to a storage position in front of the seat bottom 230 as shown in FIGS. 13 and 14. The plurality of sections provide a foot rest at a front end 331 of the occupant support 300 for a child 372 seated in a child car seat 370 as shown in FIG. 14. In some embodiments, each of the sections are padded to provide the cushion member 322 of the occupant support 300.

In some embodiments, child seats may damage seating surfaces when used over a long period of time. The occupant supports disclosed herein protect the main occupant-support seating surfaces so they remain in good condition after the child seat is removed. The present disclosure may also make installation of the child seat easier by moving portions of the occupant support to provide better access to the child car seat latch mounts (e.g., ISO FIX mounts).

In some embodiments, a layer of trim (i.e. occupant-support surface 26) that is designed to be removed, folded, stowed, etc. is included in the occupant support. The layer would be designed to look aesthetically pleasing in both deployed and stowed positions. The layer is kept safe from wear and tear plus damage from car seats by being movable to underlying layers that are exposed when the occupant support is in the object-support configuration.

In some embodiments, the layer stows into a compartment and forms a child foot rest. In some embodiments, the layer folds flat onto the seat cushion (i.e. seat bottom 30). In some embodiments, the layer folds up to the backrest. In some embodiments, the layer stows into a compartment in front of the seat base. In some embodiments, the layer stows into a compartment on the side of the seat base. In some embodiments, the layer stows on the back of the seat. In some embodiments, the layer stows into a removable bag that is placed elsewhere in the vehicle for storage.

The following numbered clauses include embodiments that are contemplated and non-limiting:

Clause 1. An occupant support comprising
a seat frame.

Clause 2. The occupant support of clause 1, any other suitable clause, or any combination of suitable clauses, further comprising a seat pad coupled to the seat frame.

Clause 3. The occupant support of clause 2, any other suitable clause, or any combination of suitable clauses, wherein the seat pad includes a cushion member fixed to the seat frame.

Clause 4. The occupant support of clause 3, any other suitable clause, or any combination of suitable clauses, wherein the seat pad includes an outer occupant-support surface arranged to cover the cushion member and configured to support an occupant thereon when the occupant support is in a normal occupant-support configuration.

Clause 5. The occupant support of clause 4, any other suitable clause, or any combination of suitable clauses, wherein the seat pad includes an inner object-support surface located between the outer occupant-support surface and the cushion member when the occupant support is in the normal occupant-support configuration.

Clause 6. The occupant support of clause 5, any other suitable clause, or any combination of suitable clauses, wherein the seat pad is configured to change from the normal occupant-support configuration to an object-support configuration in which the inner object-support surface is an outermost surface of the seat pad and is arranged to support an object thereon without the object contacting the occupant-support surface so that wear of the occupant-support surface is minimized.

Clause 7. The occupant support of clause 6, any other suitable clause, or any other suitable combination of clauses, wherein the seat pad includes a seat bottom and a seat back, the seat bottom including a seat-bottom cushion member and a seat-bottom occupant-support surface, the seat back including a seat-back cushion member and a seat-back occupant-support surface, and, when the seat pad is in the object-support configuration, the seat-bottom occupant-support surface engages with the seat-back occupant-support surface.

Clause 8. The occupant support of clause 7, any other suitable clause, or any other suitable combination of clauses, any other suitable clause, or any other suitable combination of clause wherein, when the seat pad is in the object-support configuration, the seat-bottom occupant-support surface is arranged to lie against the seat back.

Clause 9. The occupant support of clause 7, any other suitable clause, or any other suitable combination of clauses, wherein, when the seat pad is in the object-support configuration, the seat-back occupant-support surface is arranged to lie against the seat bottom.

Clause 10. The occupant support of clause 7, any other suitable clause, or any other suitable combination of clauses, wherein at least one of the seat bottom and the seat back includes an outer layer that has the occupant-support surface, a first inner layer coupled to the outer layer in a fixed position, and a second inner layer coupled to one of the cushion member of the at least one of the seat bottom, at least one of the first inner layer and the second inner layer having the object-support surface.

Clause 11. The occupant support of clause 10, any other suitable clause, or any other suitable combination of clauses, wherein the outer layer and the first inner layer lie across the other of the seat bottom and the seat back when the occupant support is in the object support configuration and the first inner layer and the second inner layer cooperate to provide the object-support surface along the seat bottom and the seat back.

Clause 12. The occupant support of clause 6, any other suitable clause, or any other suitable combination of clauses, wherein the seat pad includes an outer trim having an object-support trim cover and an occupant-support trim cover arranged to overlie the object support trim cover when the occupant support is in the occupant-support configuration to provide the occupant-support surface and is completely removable from the object-support trim cover to provide the object support configuration of the occupant support.

Clause 13. The occupant support of clause 12, any other suitable clause, or any other suitable combination of clauses, wherein the occupant support trim cover includes at least one attachment feature that mounts the occupant-support trim cover to the object support trim cover in a storage position against at least one of a front end of the occupant support, a lateral side of the occupant support, and a back side of the occupant support.

Clause 14. An occupant support comprising
a seat bottom including a seat-bottom cushion member and a seat-bottom trim cover.

Clause 15. The occupant support of clause 14, any other suitable clause, or any other suitable combination of clauses, further comprising a seat back coupled to the seat bottom, the seat back including a seat-back cushion member and a seat-back trim cover.

Clause 16. The occupant support of clause 15, any other suitable clause, or any other suitable combination of clause, further comprising a movable flap coupled to at least one of the seat bottom and the seat back.

Clause 17. The occupant support of clause 16, any other suitable clause, or any other suitable combination of clauses, wherein the movable flap includes an occupant-support surface on a first side of the movable flap and an object-support surface on an opposite second side of the movable flap.

Clause 18. The occupant support of clause 17, any other suitable clause, or any other suitable combination of clauses, wherein the movable flap is movable relative to the seat bottom and the seat back from an occupant-support position in which the occupant-support surface faces outwardly away from one of the seat bottom and the seat back and the object-support surface interfaces with the one of the seat bottom and the seat back, and an object-support position, in which the occupant-support surface interfaces with the other of the seat bottom and the seat back and the object-support surface faces outwardly away from the other of the seat bottom and the seat back.

Clause 19. The occupant support of clause 18, any other suitable clause, or any other suitable combination of clauses, wherein the movable flap is mounted to one of the seat bottom and the seat back for pivotable movement about an axis such that the movable flap is configured to be pivoted upwardly away from the seat bottom and toward the seat back to change the seat pad from the occupant-support configuration to the object-support configuration.

Clause 20. The occupant support of clause 19, any other suitable clause, or any other suitable combination of clauses, wherein the movable flap includes a main sheet that provides a portion of the occupant-support surface on a first side of the main sheet and a portion of the object-support surface on an opposite second side of the main sheet and a retainer unit that retains the movable flap against the seat back in the object-support configuration.

Clause 21. The occupant support of clause 20, any other suitable clause, or any other suitable combination of clauses, wherein the retainer unit includes a first attachment coupled to a first lateral edge of the main sheet and a second attachment coupled to a second lateral edge of the main sheet, the first attachment being configured to mount to a first side of the seat back and the second attachment being configured to mount to an opposite second side of the seat back.

Clause 22. The occupant support of clause 18, any other suitable clause, or any other suitable combination of clauses, wherein the movable flap is mounted to one of the seat bottom and the seat back for pivotable movement about an axis such that the movable flap is configured to be pivoted downwardly away from the seat back and toward the seat bottom to change the seat pad from the occupant-support configuration to the object-support configuration.

Clause 23. The occupant support of clause 22, any other suitable clause, or any other suitable combination of clauses, wherein the movable flap includes a main sheet that provides a portion of the occupant-support surface on a first side of the main sheet and a portion of the object-support surface on an opposite second side of the main sheet and a retainer unit that retains the movable flap against the seat bottom in the object-support configuration.

Clause 24. The occupant support of clause 23, any other suitable clause, or any other suitable combination of clauses, wherein the retainer unit includes a first attachment coupled to a first lateral edge of the main sheet and a second attachment coupled to a second lateral edge of the main sheet, the first attachment being configured to mount to a first side of the seat back and the second attachment being configured to mount to an opposite second side of the seat back.

Clause 25. A method comprising
supporting a person on an occupant support in a vehicle.

Clause 26. The method of clause 25, any other suitable clause, or any other suitable combination of clauses, wherein the occupant support including a seat frame and a seat pad coupled to the seat frame, the seat pad including a cushion member fixed to the seat frame and an outer trim arranged to cover the cushion member.

Clause 27. The method of clause 26, any other suitable clause, or any other suitable combination of clauses, wherein the outer trim being arranged in a normal occupant-support surface in which an outer occupant-support surface is the outermost surface of the occupant support when an occupant is seated thereon.

Clause 28. The method of clause 27, any other suitable clause, or any other suitable combination of clauses, further comprising changing the outer trim from the normal occupant-support configuration to an object-support configuration, in which the outer occupant-support surface is moved relative to the rest of the occupant support to expose an inner object-support surface that was arranged beneath the occupant-support surface.

Clause 29. The method of clause 28, any other suitable clause, or any other suitable combination of clauses, further comprising supporting an object on the object-support surface in the object-support configuration without the object contacting the occupant-support surface so that the occupant-support surface is preserved.

Clause 30. The method of clause 29, any other suitable clause, or any other suitable combination of clauses, wherein the outer trim includes an inner object-support trim cover having the object-support surface and an occupant-support trim cover having the occupant-support surface, and wherein the step of changing the outer trim from the normal occupant-support configuration to the object-support includes folding the occupant-support trim cover such that portions of the occupant support surface interface with one another.

Clause 31. The method of clause 30, any other suitable clause, or any other suitable combination of clauses, wherein the occupant-support trim cover has a portion of the occupant-support surface on a first side of the occupant-support trim cover and a portion of the object-support surface is coupled to an opposite second side of the occupant-support trim cover for movement therewith, and the step of folding the occupant-support trim cover causes the portion of the object-support surface coupled to the second side of the occupant-support trim cover to overlie the occupant-support surface.

Clause 32. The method of clause 30, any other suitable clause, or any other suitable combination of clauses, wherein the method further comprises at least partially removing the occupant-support trim cover from the object-support trim cover and attaching the occupant-support trim cover to the object-support trim cover in a storage position when the outer trim is in the object-support configuration.

Clause 33. The method of clause 32, any other suitable clause, or any other suitable combination of clauses, wherein the step of attaching the occupant support trim cover to the object-support trim cover includes attaching the occupant-support trim cover to a front end of the seat pad to provide a foot rest for a child seated in a child restraint supported by the occupant support in the object-support configuration.

The invention claimed is:
1. An occupant support comprising
a seat frame and
a seat pad coupled to the seat frame, the seat pad including a cushion member fixed to the seat frame, a contoured outer occupant-support surface arranged to cover the cushion member and configured to support an occupant thereon when the occupant support is in a normal occupant-support configuration, and an inner object-support surface located between the outer occupant-support surface and the cushion member when the occupant support is in the normal occupant-support configuration,
wherein the seat pad is configured to change from the normal occupant-support configuration to an object-support configuration by removal of at least a portion of the outer-occupant support surface that covers each of a seat bottom portion and a seat back portion of the cushion member such that the inner object-support surface is an outermost surface of the seat pad, is flat, and is arranged to support an object thereon without the object contacting the occupant-support surface so that wear of the occupant-support surface is minimized.

2. The occupant support of claim 1, wherein the seat pad includes an outer trim having an object-support trim cover and an occupant-support trim cover arranged to overlie the object support trim cover when the occupant support is in the occupant-support configuration to provide the occupant-support surface and is completely removable from the object-support trim cover to provide the object support configuration of the occupant support.

3. The occupant support of claim 2, wherein the occupant support trim cover includes at least one attachment feature that mounts the occupant-support trim cover to the object support trim cover in a storage position against at least one of a front end of the occupant support, a lateral side of the occupant support, and a back side of the occupant support.

4. The occupant support of claim 1, where the seat pad further includes an outer trim having an outer occupant-support trim cover and an object-support trim cover, the occupant-support trim cover providing the occupant-support surface and the object-support trim cover providing the object-support surface, and wherein the occupant-support trim cover overlies the object-support trim cover in the occupant-support configuration.

5. The occupant support of claim 4, wherein the occupant-support trim cover is coupled removably to the object-support trim cover and the object-support trim cover is fixed in place relative to the seat frame.

6. The occupant support of claim 5, wherein the occupant-support trim cover includes a plurality of sections that are foldable relative to one another to a storage position.

7. The occupant support of claim 6, wherein the plurality of sections are configured to provide a foot rest at a front end of the occupant support.

8. The occupant support of claim 6, wherein each of the sections are padded to provide cushions in the occupant support configuration.

9. A method comprising
supporting a person on an occupant support in a vehicle, the occupant support including a seat frame and a seat pad coupled to the seat frame, the seat pad including a cushion member fixed to the seat frame and an outer trim arranged to cover the cushion member, the outer trim being arranged in a normal occupant-support surface in which an outer occupant-support surface is a contoured outermost surface of the occupant support configured be engaged by an occupant when the occupant is seated thereon,
changing the outer trim from the normal occupant-support configuration to an object-support configuration, by removing at least a portion of the outer trim that covers each of a seat bottom portion and a seat back portion of the cushion member to expose a flat inner object-support surface that was arranged beneath the occupant-support surface, and
supporting an object on the object-support surface in the object-support configuration without the object contacting the occupant-support surface so that the occupant-support surface is preserved.

10. The method of claim 9, wherein the outer trim includes an inner object-support trim cover and wherein the step of changing the outer trim from the normal occupant-support configuration to the object-support includes folding the occupant-support trim cover such that portions of the occupant support surface interface with one another.

11. The method of claim 10, wherein the method further comprises at least partially removing the occupant-support trim cover from the object-support trim cover and attaching the occupant-support trim cover to the object-support trim cover in a storage position when the outer trim is in the object-support configuration.

12. The method of claim 11, wherein the step of attaching the occupant support trim cover to the object-support trim cover includes attaching the occupant-support trim cover to a front end of the seat pad to provide a foot rest for a child seated in a child restraint supported by the occupant support in the object-support configuration.

* * * * *